US007017977B1

(12) United States Patent
Kelter (10) Patent No.: US 7,017,977 B1
(45) Date of Patent: Mar. 28, 2006

(54) TRUCK WITH BED PARTITION

(76) Inventor: Robert S. Kelter, 8722 W. Cherry Hills Dr., Peoria, AZ (US) 85345

( * ) Notice: Subject to any disclaimer, the term of this patent is extended or adjusted under 35 U.S.C. 154(b) by 0 days.

(21) Appl. No.: 10/827,656

(22) Filed: Apr. 19, 2004

(51) Int. Cl.
*B62D 33/04* (2006.01)

(52) U.S. Cl. .................................. 296/182.1
(58) Field of Classification Search ............ 296/182.1, 296/37.1, 37.5, 37.6, 39.2, 24.3, 24.4
See application file for complete search history.

(56) References Cited

U.S. PATENT DOCUMENTS

| 4,875,730 | A | | 10/1989 | Justice |
|---|---|---|---|---|
| 5,265,993 | A | * | 11/1993 | Wayne .................. 410/129 |
| 5,415,506 | A | * | 5/1995 | Payne .................. 410/129 |
| 5,456,514 | A | | 10/1995 | Justice |
| 5,464,264 | A | * | 11/1995 | Wilson .................. 296/37.6 |
| 5,586,850 | A | | 12/1996 | Johnson |
| 5,743,589 | A | * | 4/1998 | Felker .................. 296/180.5 |
| 5,845,953 | A | | 12/1998 | Rusnock |
| 6,015,178 | A | | 1/2000 | Haack |
| 6,120,076 | A | * | 9/2000 | Adsit et al. ............. 296/26.11 |
| 6,206,624 | B1 | | 3/2001 | Brandenburg |
| 6,254,162 | B1 | * | 7/2001 | Faber et al. ............. 296/39.2 |
| 6,267,427 | B1 | | 7/2001 | Ziehl |
| 6,302,465 | B1 | * | 10/2001 | Faber et al. ............. 296/39.1 |
| 6,478,356 | B1 | * | 11/2002 | Wayne .................. 296/39.2 |
| 6,543,975 | B1 | | 4/2003 | Kopperud |
| 6,619,723 | B1 | | 9/2003 | Duffy |
| 6,626,624 | B1 | | 9/2003 | Kopperud |
| 6,629,807 | B1 | | 10/2003 | Bernardo |
| 6,648,398 | B1 | | 11/2003 | Duffy |
| 2002/0101088 | A1 | | 8/2002 | Rigau |
| 2002/0187016 | A1 | | 12/2002 | Kopperud |
| 2003/0082023 | A1 | | 5/2003 | Bernardo |

* cited by examiner

*Primary Examiner*—H. Gutman
(74) *Attorney, Agent, or Firm*—Parsons & Goltry; Robert A. Parsons; Michael W. Goltry (57) ABSTRACT

A vehicle includes a chassis, a cab carried by the chassis, and a bed carried by the chassis. The bed includes a floor, opposing side walls, a front end panel and a rear end. The floor has a depression formed therein intermediate the front panel and the rear end and carries a panel having an edge pivotally coupled to the floor. The panel is pivotally moveable between an upright position extending between opposing side walls, and a lowered position wherein the panel substantially fills the depression to form a generally planar surface to the floor. An engagement mechanism is provided for retaining the panel in the upright position.

19 Claims, 6 Drawing Sheets

TRUCK WITH BED PARTITION

FIELD OF THE INVENTION

This invention relates to pickup trucks.

More particularly, the present invention relates to partitioning of the bed of a pickup truck.

BACKGROUND OF THE INVENTION vehicles having beds and in particular pickup trucks, have long been known and used for pleasure, as well as utility. Typically, vehicles with beds are employed to carry items, large or small, many or few. When fully loaded, items carried within these beds are relatively stable and secure. However, if the bed is less than full, items carried therein may shift, slide or roll. Typically, items are secured using ropes, bungee cords, netting and the like. While somewhat effective, securing a load can be difficult and time-consuming and the proper materials may not be available at all times.

It would be highly advantageous, therefore, to remedy the foregoing and other deficiencies inherent in the prior art.

Accordingly, it is an object the present invention to provide a new and improved truck bed.

Another object of the present invention is to provide a truck bed having integral partitions.

SUMMARY OF THE INVENTION

Briefly, to achieve the desired objects of the present invention in accordance with a preferred embodiment thereof, provided is a vehicle including a chassis, a cab carried by the chassis, and a bed carried by the chassis. The bed includes a floor, opposing side walls, a front end panel and a rear end. The floor has a depression formed therein intermediate the front panel and the rear end and carries a panel having an edge pivotally coupled to the floor. The panel is pivotally moveable between an upright position extending between opposing side walls, and a lowered position wherein the panel substantially fills the depression to form a generally planar surface to the floor. An engagement mechanism is provided for retaining the panel in the upright position.

In a specific aspect of the invention, the engagement mechanism includes a latch pin extending from an end of the panel, movable between an extended position and a retracted position. A pin receiver is carried by one of the opposing side walls adjacent the panel in the upright position for receiving the pin in the extended position. The pin receiver includes a vertical support member carried by the side wall, and having an opening for receiving the pin in the extended position. A flange extends from the support member for receiving the panel in abutting engagement in the upright position.

In yet a further aspect, a second depression is formed in the floor intermediate the front panel and the rear edge and spaced from the depression. A second panel having an edge is pivotally coupled to the floor. The panel is pivotally moveable between an upright position extending between opposing side walls, and a lowered position wherein the panel substantially fills the second depression to form a generally planar surface to the floor.

BRIEF DESCRIPTION OF THE DRAWINGS

The foregoing and further and more specific objects and advantages of the invention will become readily apparent to those skilled in the art from the following detailed description of a preferred embodiment thereof, taken in conjunction with the drawings in which:

FIG. 1 is a partial perspective view of the vehicle according to the present invention of;

FIG. 7 is a partial perspective view of the latch mechanism; and.

DETAILED DESCRIPTION OF A PREFERRED EMBODIMENT

Figure 1:
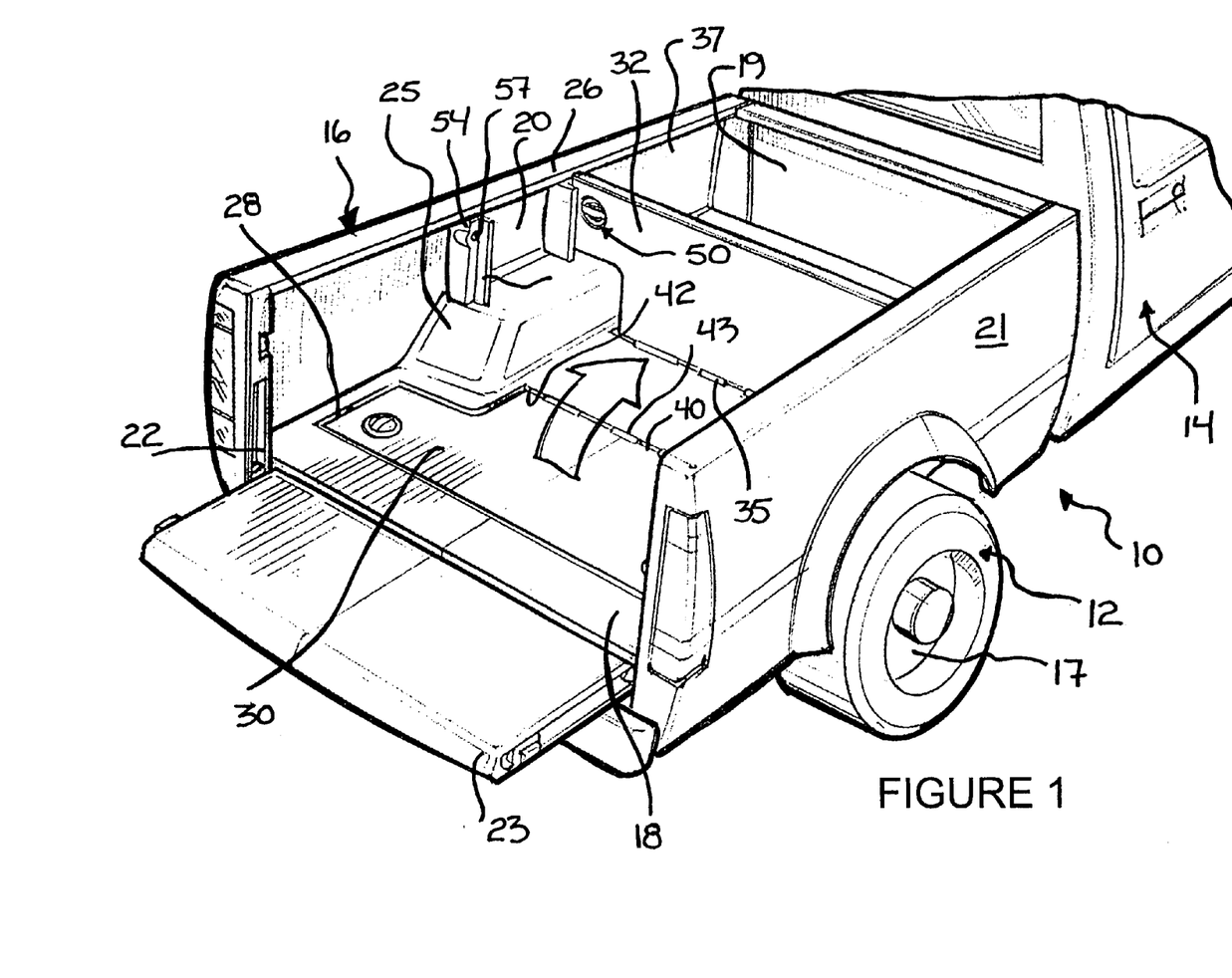

Turning now to the drawings in which like reference characters indicate corresponding elements throughout the several views, attention is directed to FIG. 1 which illustrates a portion of a vehicle 10. Vehicle 10, in this preferred embodiment, is a pickup truck including a chassis 12, a cab 14 and a bed 16. Chassis 12, for purposes of this application, is defined as including wheels 17 and other portions of the vehicle not visible, such as a frame, drive train, etc. It will be understood by those skilled in the art that vehicle 10 can include substantially any vehicles having a bed. Vehicle 10 is not described in greater detail, as pickup trucks are well-known in the art. The ensuing description will focus upon bed 16 of vehicle 10. For purposes of orientation, directions will be referred to as forwardly, toward the front or cab of the vehicle, and rearwardly, toward the back or rear of the vehicle.

Bed 16 is carried upon chassis 12 and positioned rearwardly of cab 14. Bed 16 includes a floor 18, a front end panel 19 and opposing side walls 20 and 21. Front end panel 19 and opposing side walls 20 and 21 extend substantially vertically upward from peripheral edges of floor 18. A rear end 22 can include a tailgate assembly 23 or other closure apparatus known in the art. Wheel wells 25 extend from floor 18 adjacent opposing side walls 20 and 21, intermediate front end panel 19 and rear end 22. Opposing side walls 20 and 21, and front end panel 19 terminate at an upper edge in a lip or rail 26 extending inwardly. Floor 18 includes a rearward depression 28, and a forward depression 29. A rearward panel 30 is carried within rearward depression 28 and a forward panel 32 is carried within forward depression 29. Rearward panel 30 and forward panel 32 are each hingedly coupled at a lower edge thereof to a side of their respective depression. While two depressions with corresponding panels are employed in the preferred embodiment, it will be understood that one or more depressions with corresponding panels can be employed.

Figure 3:
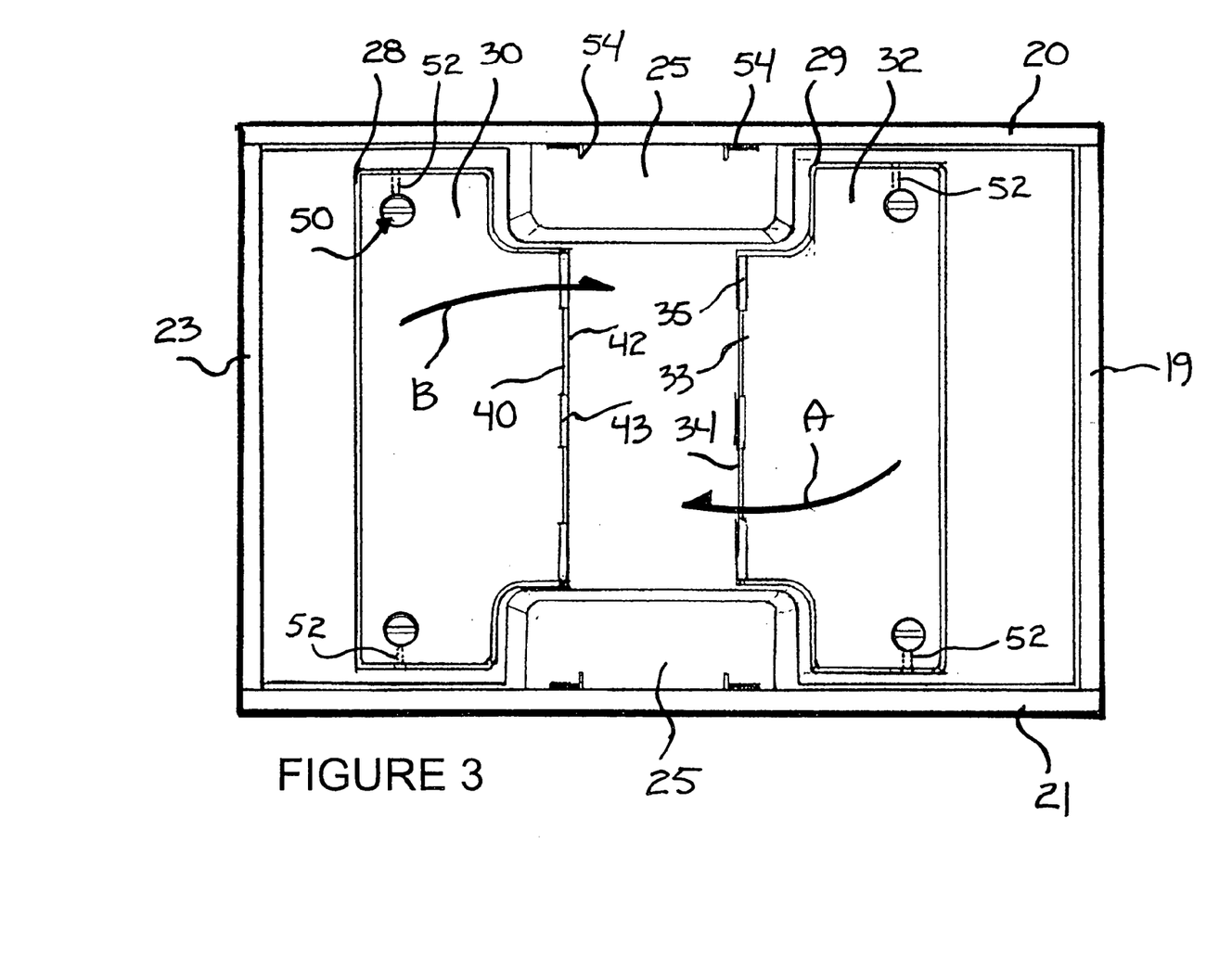
FIG. 3 is a top plan view of a bed, according to the present invention.

With additional reference to FIG. 3, forward panel 32 is pivotally coupled at a lower edge 33 to a rearward edge 34 of forward depression 29 by hinges 35. Rearward edge 34 of forward depression 29 extends substantially transversely across bed 16 between a forward portion of wheel wells 25. Forward panel 32 is pivotable about hinges 35 between a lowered position and an upright position. In the lowered position, forward panel 32 substantially fills forward depression 29 to create a generally planar, floor 18. Forward panel 32 is pivoted upwardly and rearwardly in the direction of arrowed line A, into an upright position between the forward portions of wheel wells 25. In the upright position, forward panel 32 establishes a forward compartment 37 with front end panel 19.

Figure 5:
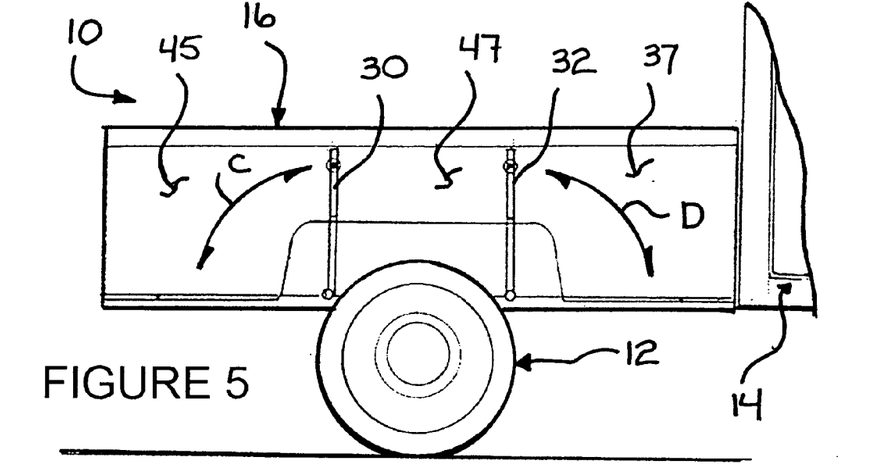
FIG. 5 is a schematic side view, illustrating a truck bed with panels in an upright position.

Still referring to FIG. 3, rearward panel 30 is pivotally coupled at a lower edge 40 to a forward edge 42 of rearward depression 28 by hinges 43. Forward edge 42 of rearward depression 28 extends substantially transversely across bed 16 between a rearward portion of wheel wells 25. Rearward panel 30 is pivotable about hinges 43 between a lowered position and an upright position. In the lowered position, rearward panel 30 substantially fills rearward depression 28 to form a generally planar floor 18. Rearward panel 30 is pivoted upwardly and forwardly in the direction of arrowed line B, into an upright position between the rearward portions of wheel wells 25. In the upright position, rearward panel 30 establishes a rearward compartment 45 with tailgate 23. With additional reference to FIG. 5, rearward panel 30 and forward panel 32 can be moved between the raised and lowered positions as indicated by arcuate arrowed lines C and D, respectively. With rearward panel 30 and forward panel 32 in their upright positions, a central compartment 47 is created therebetween. As will be readily understood by one skilled in the art, more or less, and larger or smaller compartments can be created by raising or lowering rearward panel 30 and forward panel 32 in various combinations.

One skilled in the art will understand that the rearward panel 30 and forward panel 32 can be of various shapes and dimensions to accurately fit the dimensions of different beds. In this preferred embodiment, rearward panel 30 and forward panel 32 have a generally T-shape to accommodate wheel wells 25. During fabrication of bed 16, positioning of rearward depression 28 and rearward panel 30, as well as forward depression 29 and forward panel 32 can be adjusted forwardly or rearwardly to form different sized compartments therebetween. As an example, if rearward depression 28 and rearward panel 30 are moved rearward of wheel wells 25, rearward compartment 45 is reduced and a substantially rectangular shaped panel can be employed, as wheel well 25 need not be accommodated. Furthermore, it will be understood that rearward depression 28 and forward depression 29 are shaped to closely receive rearward panel 30 and forward panel 32, respectively. Thus, a substantially planar floor 18 is maintained with panels 30 and 32 in the lowered position. To further insure that bed 18 is substantially planar, hinges 35 and 43 may be recessed or a hinged type with a profile below the surface of bed 18 can be used. It will also be understood, that hinges 35 and 43 are intended to refer to structures permitting pivotal movement of forward panel 32 and rearward panel 30, respectively. This may consist, for example, of a rod journaled through lower edge 33 and 40, respectively. The rod would then be received by the edges of their respective depression.

Figure 2:
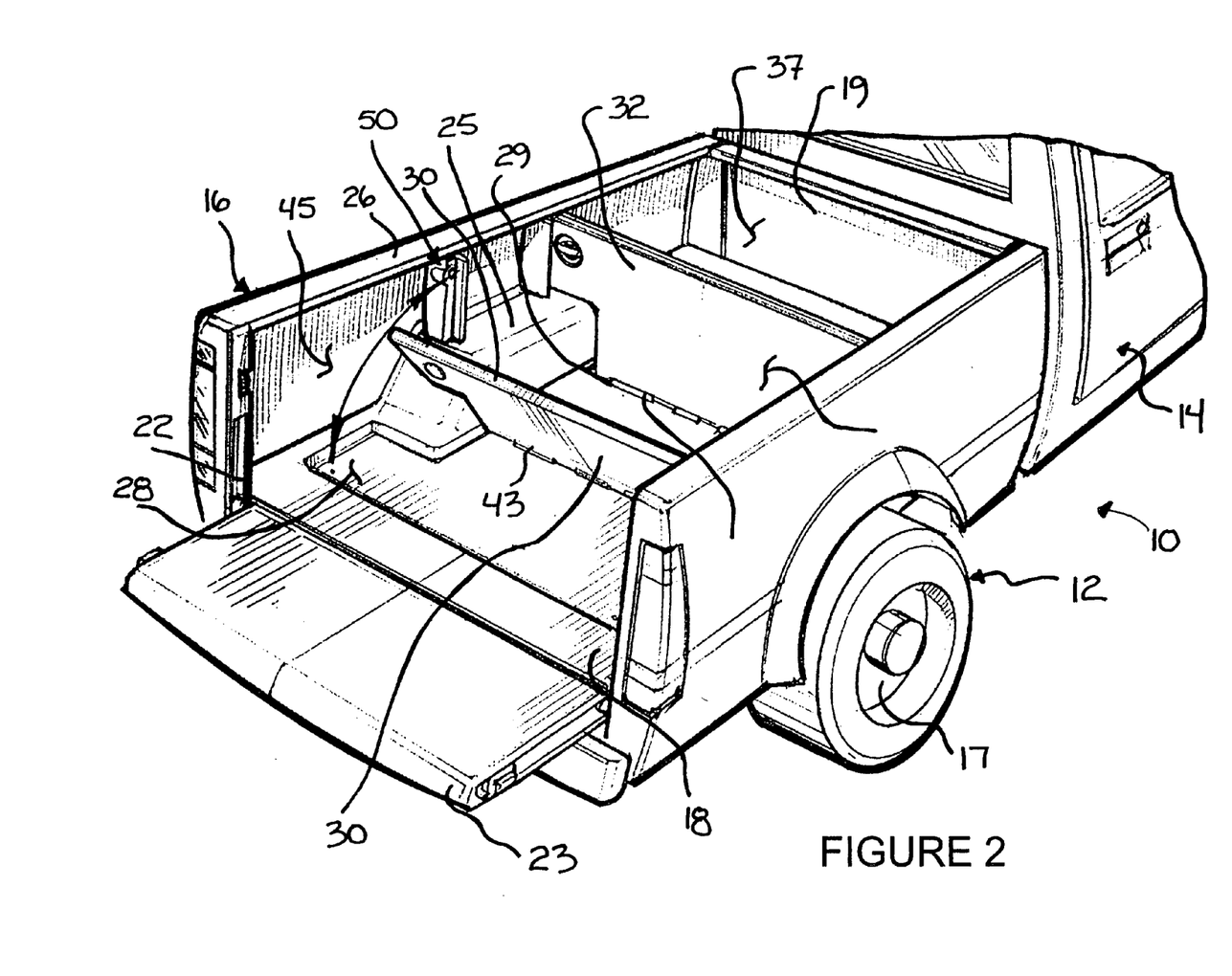
FIG. 2 is a partial perspective view illustrating the vehicle of FIG. 1 with panels in an upright position.
Figure 4:
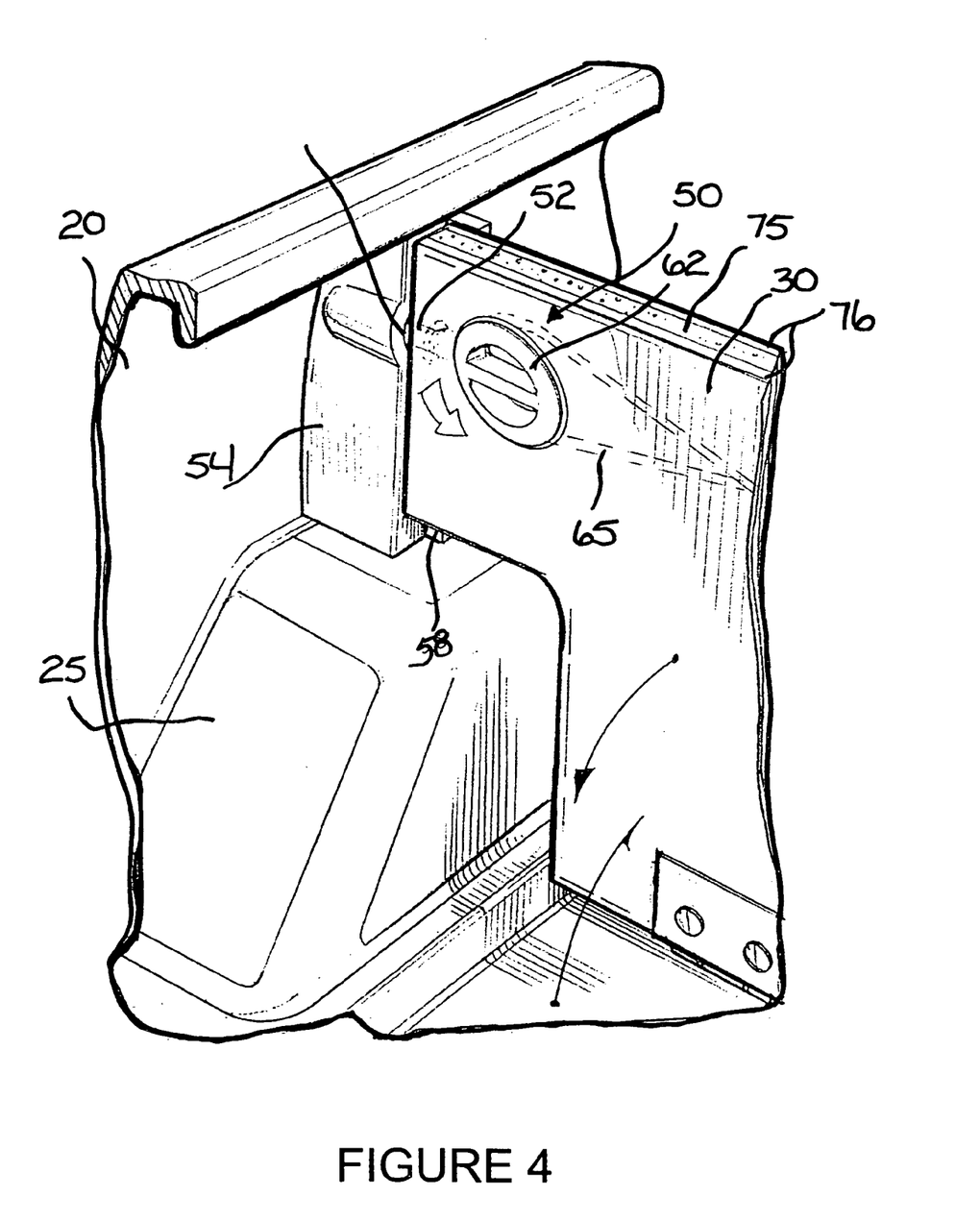
FIG. 4 is a partial perspective view illustrating engagement of a panel in an upright position.
Figure 7:
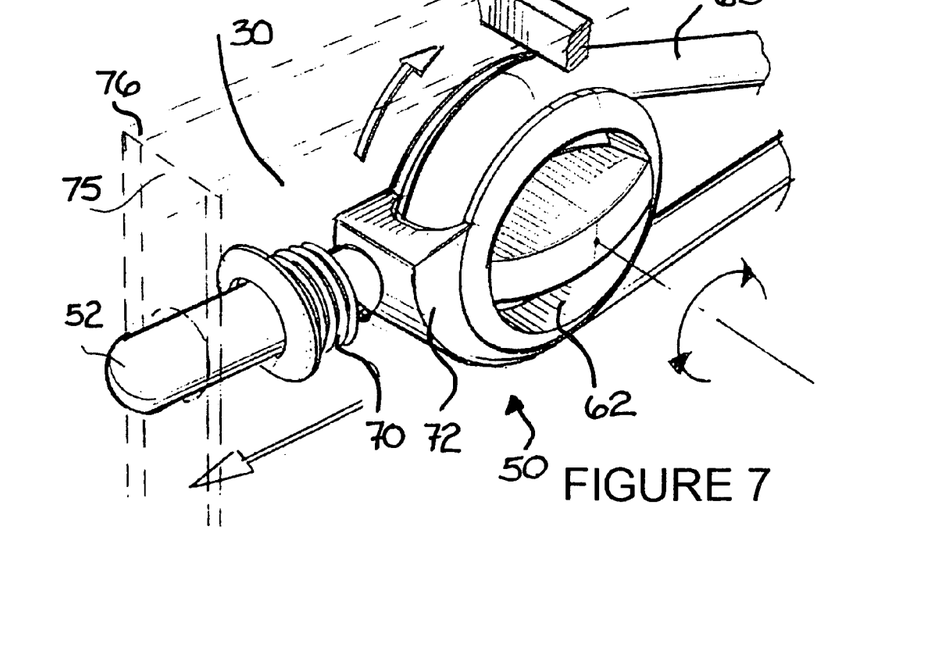

With continued reference to FIGS. 1 and 2, and additional reference to FIGS. 4 and 7, engagement mechanisms 50 are illustrated for securing rearward panel 30 and forward panel 32 in one of the upright and lowered positions. While various different engagement mechanisms can be employed, such as latches, pins, and the like, engagement mechanisms 50 can be operated from either side of the vehicle. Each panel includes engagement mechanism 50, and since each is substantially identical, only one will be described in detail. Engagement mechanisms 50 for rearward panel 30 includes a latch pin 52 extending from an end of panel 30, and movable between an extended position and a retracted position. One pin 52 can be employed, but to provide greater security, a second pin is carried by an opposing end of panel 30, movable between an extended and retracted position. Engagement mechanism 50 further includes a pin receiver carried by opposing side wall 20 adjacent panel 30 in the upright position for receiving pin 52 in the extended position. As will be readily understood, a second pin receiver will be carried by opposing side wall 21 when a second pin is employed.

The pin receiver can be simply an aperture formed in side wall 20 or rail 26 for receiving pin 52, or as preferred, is a vertical support member 54 carried by side wall 20. Vertical support member 54 includes an opening 57 for receiving pin 52 in the extended position, and a flange 58 for receiving panel 30 in abutting engagement in the upright position. Flange 58 extends from a forward edge of vertical support member 54 when employed with rearward panel 30, and acts as a stop and additional support for strength and rigidity. Since forward panel 32 moves in an opposite direction, a flange extends from a rearward edge of a vertical support associate therewith.

Figure 6:
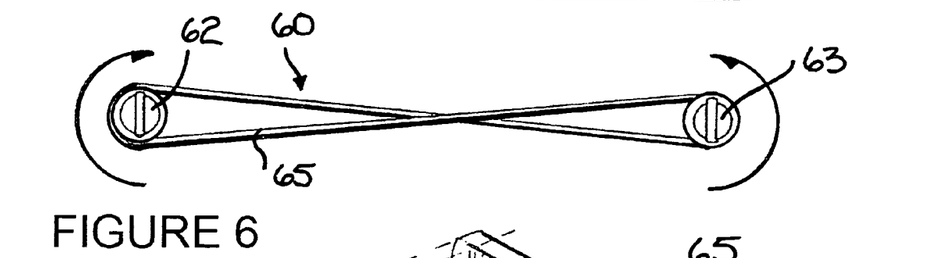
FIG. 6 is a schematic illustration of a portion of engagement mechanism.

When two opposing pins are employed, engagement mechanism 50 further includes an actuation mechanism 60 for concurrently moving latch pins 52 between the extended position and the retracted position. While various mechanisms can be employed, the preferred mechanism includes wheels 62 and 63 connected by a drive band 65 twisted into a figure eight (FIG. 6). As one of wheels 62 and 63 is turned, drive band 65 turns the other of wheels 62 and 63 in a mirrored response. Referring specifically to FIG. 7, a single pin assembly is illustrated. The opposing pin assembly is identical and therefore is not also described. Pin 52 is biased inwardly by a spring 70. A cam surface 72 is carried by wheel 62 and drives pin 52 outwardly into the extended position against the bias of spring 70 when rotated in a counter clockwise direction as illustrated. Rotation of wheel 62 in a clockwise direction allows pin 52 to move to the retracted position. Thus, rotation of either of wheels 62 and 63 results in the movement of both pins 52 to the extended or retracted positions as desired.

Still referring specifically to FIG. 7, panels 30 and 32 are preferably fabricated of a light strong construction such as structural foam 75 between metal or plastic sheets 76. The pin mechanism and actuating mechanism is carried between the sheets with the wheel assessable from either side of panels 30 and 32 or from only the forward side. It will be understood that a solid panel can also be employed, with the mechanism carried on a surface thereof. Other features can include drain holes located in depressions 28 and 29, weather seals around the edges of panels 30 and 32, etc.

Figure 8:
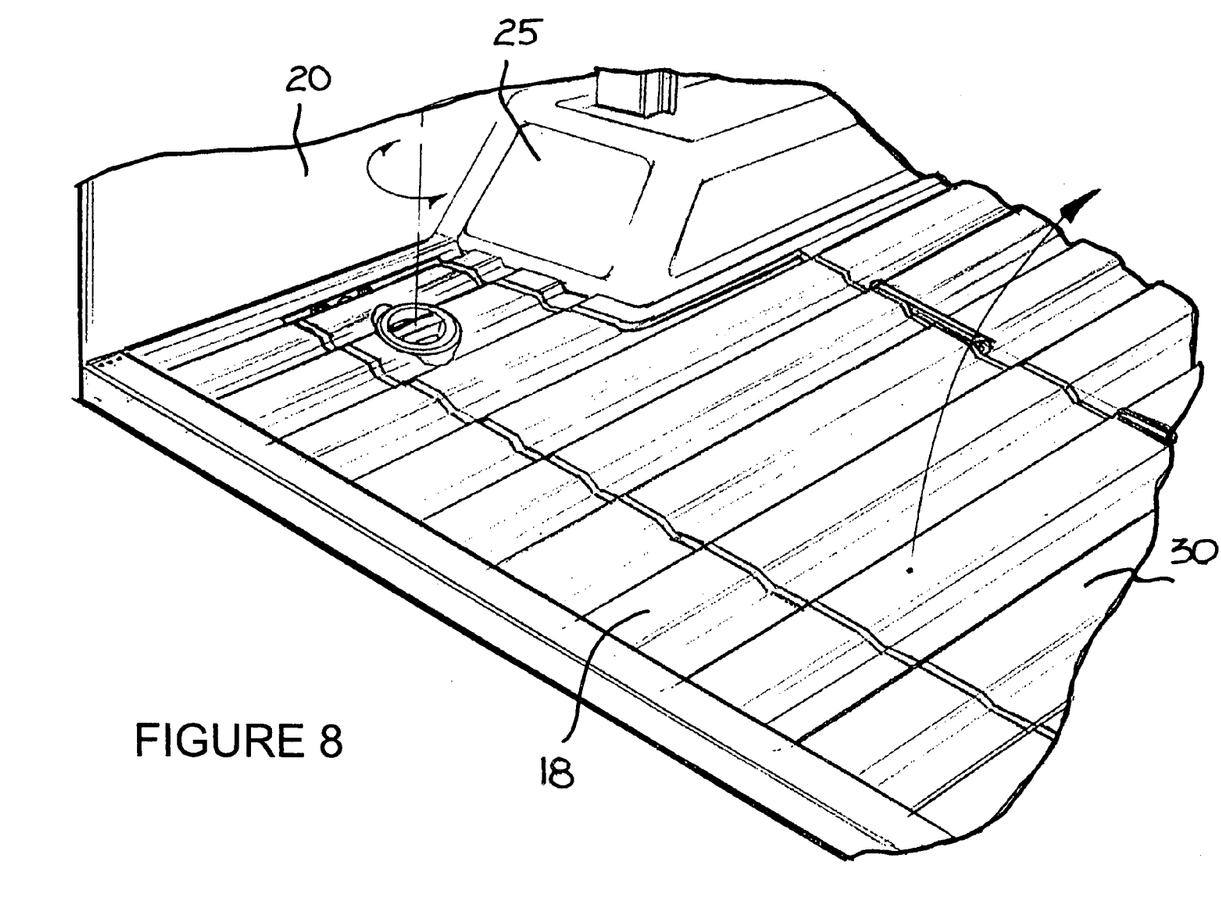
FIG. 8 is a partial perspective view illustrating a portion of a corrugated truck bed with a panel in the lower position.

Referring to FIG. 8, often the bed of a vehicle is corrugated. While the previous illustrations showed a generally flat bed 18, one skilled in the art will understand that a corrugated bed can be accommodated. Specifically, panels 30 and 32 can have their surface upwardly directed surface corrugated to match the rest of the bed. In this manner, when panels 30 and 32 are in the lowered position filling depressions 28 and 29, the floor of the bed is a generally contiguous surface. For purposes of this application, a flat or smooth bed and a corrugated bed are considered to be planar. Specifically, floor 18 is considered to be planar with panels 30 and 32 in the lowered position since a generally contiguous surface is formed.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

What is claimed is:

1. A vehicle comprising:
   a chassis;
   a cab carried by the chassis;
   a bed carried by the chassis and including a floor, opposing side walls, a front end panel and a rear end;
   the floor including a depression formed therein intermediate the front panel and the rear end; and
   a panel having an edge pivotally coupled to the floor, the panel pivotally moveable between an upright position extending between the opposing side walls, and a lowered position wherein the panel substantially fills the depression to form a generally planar surface to the floor.

2. The vehicle as claimed in claim 1 further comprising an engagement mechanism for retaining the panel in the upright position.

3. The vehicle as claimed in claim 2 wherein the engagement mechanism includes a latch pin extending from an end of the panel, and movable between an extended position and a retracted position.

4. The vehicle as claimed in claim 3 wherein the engagement mechanism further includes a pin receiver carried by one of the opposing side walls adjacent the panel in the upright position for receiving the pin in the extended position.

5. The vehicle as claimed in claim 4 wherein the pin receiver includes a vertical support member carried by the side wall, the vertical support member having an opening for receiving the pin in the extended position, and a flange for receiving the panel in abutting engagement in the upright position.

6. The vehicle as claimed in claim 2 wherein the engagement mechanism includes a first latch pin extending from an end of the panel and movable between an extended position and a retracted position, and a second latch pin extending from an opposing end of the panel and movable between an extended position and a retracted position.

7. The vehicle as claimed in claim 6 wherein the engagement mechanism further includes an actuation mechanism for moving the latch pins between the extended position and the retracted position.

8. The vehicle as claimed in claim 7 wherein the engagement mechanism further includes a first pin receiver carried by one of the opposing side walls adjacent the end of the panel in the upright position for receiving the first pin in the extended position, and a second pin receiver carried by the other of the opposing side walls adjacent the opposing end of the panel in the upright position for receiving the second pin in the extended position.

9. A vehicle having a bed, the bed comprising:
   a floor having opposing side edges, a front edge and a rear edge;
   opposing side walls extending upwardly from the opposing side edges;
   a front end wall extending upwardly from the front edge;
   a depression formed in the floor intermediate the front panel and the rear edge; and
   a panel having an edge pivotally coupled to the floor, the panel pivotally moveable between an upright position extending between the opposing side walls, and a lowered position wherein the panel substantially fills the depression to form a generally planar surface to the floor.

10. The vehicle as claimed in claim 9 further comprising an engagement mechanism for retaining the panel in the upright position.

11. The vehicle as claimed in claim 10 wherein the engagement mechanism includes a latch pin carried by an end of the panel and movable between an extended position and a retracted position, and a pin receiver carried by one of the opposing side walls adjacent the panel in the upright position for receiving the pin in the extended position.

12. The vehicle as claimed in claim 9 wherein the bed further includes opposing wheel wells extending from the floor adjacent the opposing side walls and intermediate the front end wall and the rear edge, the panel is pivotally coupled at an edge to an edge of the depression and extends substantially transversely across the bed between the wheel wells.

13. The vehicle as claimed in claim 9 further including:
   a second depression formed in the floor intermediate the front panel and the rear edge and spaced from the depression; and
   a second panel having an edge pivotally coupled to the floor, the second panel pivotally moveable between an upright position extending between the opposing side walls, and a lowered position wherein the second panel substantially fills the second depression to form a generally planar surface to the floor.

14. The vehicle as claimed in claim 13 further comprising a second engagement mechanism for retaining the second panel in the upright position.

15. The vehicle as claimed in claim 14 wherein the second engagement mechanism includes a latch pin carried by an end of the second panel and movable between an extended position and a retracted position, and a pin receiver carried by one of the opposing side walls adjacent the second panel in the upright position for receiving the pin in the extended position.

16. A vehicle having a bed, the bed comprising:
   a floor having opposing side edges, a front edge and a rear edge;
   opposing side walls extending upwardly from the opposing side edges;
   a front end wall extending upwardly from the front edge;
   opposing wheel wells extending from the floor adjacent the opposing side walls and intermediate the front end wall and the rear edge;
   a first depression formed in the floor and having a forward edge extending substantially transversely across the bed between a rearward portion of the opposing wheel wells;
   a first panel having an edge pivotally coupled to the floor adjacent the forward edge of the first depression, the panel pivotally moveable between an upright position extending between the opposing side walls, and a lowered position wherein the panel substantially fills the first depression to form a generally planar surface to the floor;
   a second depression formed in the floor and having a rearward edge extending substantially transversely across the bed between a forward portion of the opposing wheel wells;
   a second panel having an edge pivotally coupled to the floor adjacent the rearward edge of the second depression, the second panel pivotally moveable between an upright position extending between the opposing side walls, and a lowered position wherein the second panel substantially fills the second depression to form a generally planar surface to the floor; and a first engagement mechanism for retaining the first panel in the upright position and a second engagement mechanism for retaining the second panel in the upright position.

17. The vehicle as claimed in claim 16 wherein the first engagement mechanism and the second engagement mechanism each include a first latch pin extending from an end of the first panel and the second panel, respectively, and movable between an extended position and a retracted position, and a second latch pin extending from an opposing end of the first panel and the second panel, respectively and movable between an extended position and a retracted position, a first pin receiver carried by one of the opposing side walls adjacent the end of the first panel and the second panel in the upright position for receiving the first pin in the extended position, and a second pin receiver carried by the other of the opposing side walls adjacent the opposing end of the first panel and the second panel in the upright position for receiving the second pin in the extended position.

18. The vehicle as claimed in claim 17 wherein the first pin receiver and the second pin receiver each includes a vertical support member carried by the side wall, the vertical support member having an opening for receiving the first pin and the second pin, respectively, in the extended position, and a flange for receiving the first panel and the second panel in abutting engagement in the upright position.

19. The vehicle as claimed in claim 18 wherein the first engagement mechanism and the second engagement mechanism each further include an actuation mechanism for moving the first latch pin and the second latch pin between the extended position and the retracted position.

* * * * *